No. 738,605. PATENTED SEPT. 8, 1903.
R. G. CARTIN.
FERTILIZER DISTRIBUTER.
APPLICATION FILED FEB. 25, 1903.
NO MODEL. 3 SHEETS—SHEET 1.
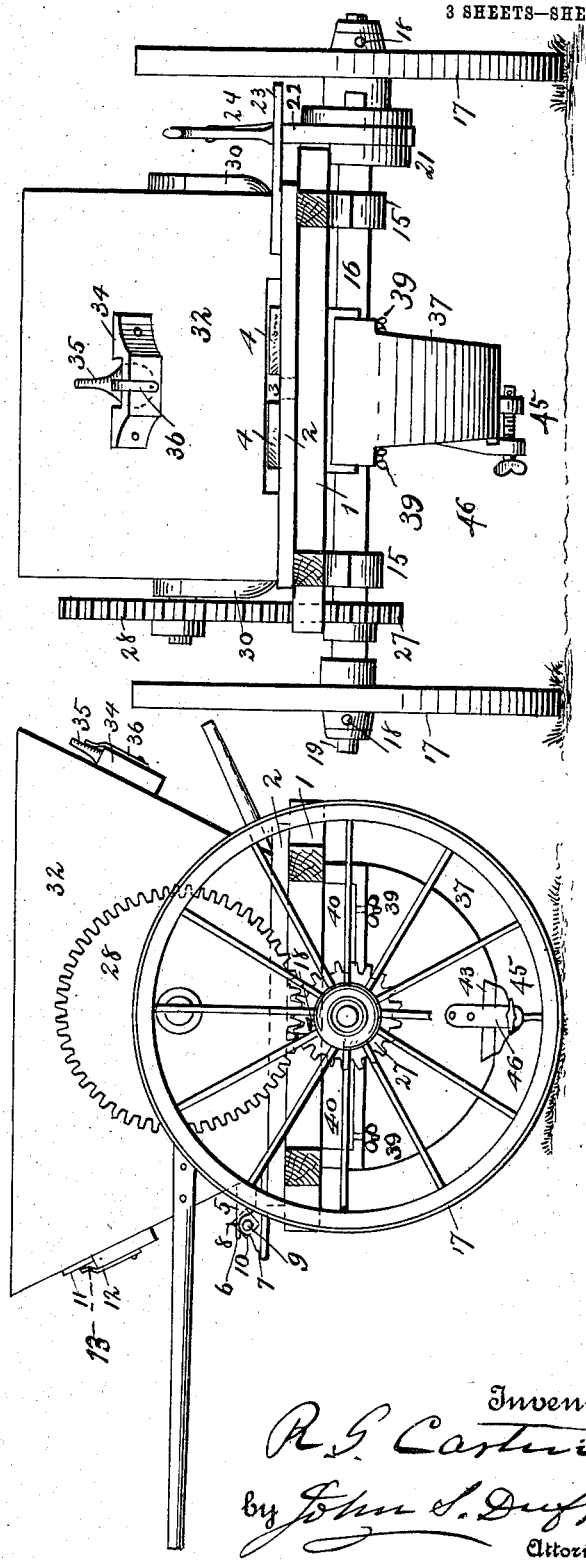
Witnesses
F. L. Ourand
J. E. Lambert
Inventor
R. G. Cartin
by John S. Duffie
Attorney

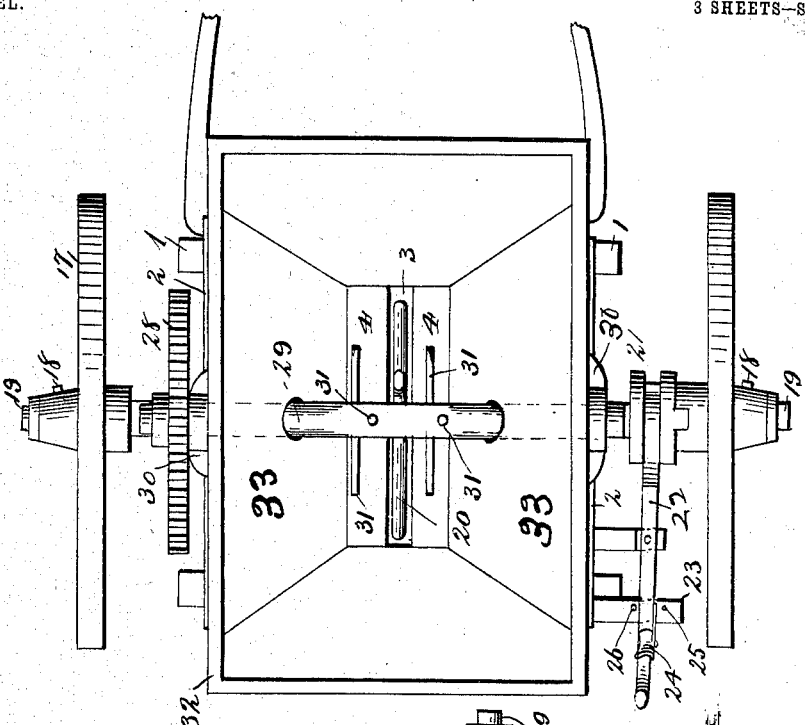

No. 738,605. PATENTED SEPT. 8, 1903.
R. G. CARTIN.
FERTILIZER DISTRIBUTER.
APPLICATION FILED FEB. 25, 1903.
NO MODEL. 3 SHEETS—SHEET 3.
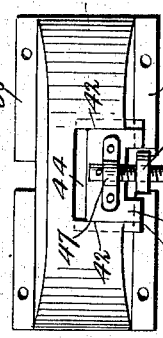
Witnesses
F. L. Durand
J. E. Lambert
Inventor
R. G. Cartin
by John S. Duffie
Attorney No. 738,605. Patented September 8, 1903.

UNITED STATES PATENT OFFICE.

RANSOM G. CARTIN, OF TUSCULUM, GEORGIA, ASSIGNOR OF ONE-HALF TO EDWARD E. FOY AND JOHN E. FOY.

FERTILIZER-DISTRIBUTER.

SPECIFICATION forming part of Letters Patent No. 738,605, dated September 8, 1903.

Application filed February 25, 1903. Serial No. 145,029. (No model.)

*To all whom it may concern:*

Be it known that I, RANSOM G. CARTIN, a citizen of the United States, residing at Tusculum, in the county of Effingham and State of Georgia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has relation to fertilizer-distributers; and it consists in the novel construction and arrangement of its parts, as hereinafter shown and described.

The object of my invention is to provide a distributer for fertilizers and the like consisting of a hopper having in its bottom an opening with a means for regulating the size of said opening, a pit located under and inclosing said opening, a wheel journaled in said pit and passing through said opening and extending up into the hopper and being of such construction as to drag the fertilizer from the hopper into the pit, the pit having at its lowest point an outlet with a means for regulating the size thereof.

In the accompanying drawings, Figure 1 is a side elevation of my invention. Fig. 2 is a rear elevation of the same. Fig. 3 is a front elevation of the same. Fig. 4 is a top plan view of the same. Fig. 5 is a vertical sectional view of the same. Fig. 6 is a bottom plan view of the hopper-pit. Fig. 7 is a top plan view of the adjustable plates employed in the hopper-bottom.

My invention is described as follows, and consists of a bed-frame 1, substantially square, covered with a bottom 2, leaving in the center thereof a longitudinal opening 3. This longitudinal opening is substantially closed by two plates 4. Their normal position, however, leaves a longitudinal opening in the center of the bottom of about one inch in width. The two plates 4 are pivoted to the rear beam of the frame and rest on the upper face of the front beam and are separated and prevented from coming entirely together by a block 5. This block is provided with a forked elevation 6. On the upper face of each of the plates 4 is secured a threaded lug 7, carrying on its upper part a pointer 8, and working through this threaded lug 7 is a right and left threaded bolt 9, having in its center a square fixed nut 10. This fixed nut is operated by a wrench 11, which for safety is usually carried in a pocket 12, secured to the front wall and outer face of the hopper and secured from dropping out by a spring 13, the lower end of which is secured to the outer wall of the pocket, while the upper end rests against the wrench. This right and left bolt regulates the distance between the two plates 4, and consequently the amount of fertilizer passed from the hopper into the pit below the same.

To enable the operator to determine the exact width of the opening, the lugs 7 are provided with pointers 8, passing over a scale 14, secured to the front end of the hopper just above said pointers. The distance between these numerals on said scale is just about one-half inch, so that when the pointers point to the numerals 1 the opening 3 is just one inch wide. When they point to the numerals 2, the opening is two inches wide, and so on.

Secured to the lower face of the side rails of the bottom of the frame 1 are bearings 15, and journaled in these bearings is a shaft 16, on each end of which is journaled a wheel 17. The hub of each wheel is provided with an oiling-plug 18, that the oil may be conveyed to the self-oiling spindles 19.

Rigidly secured to the center of the shaft is a horned or armed wheel 20, the horns of which run through the opening 3 and draw the fertilizer through said slot and deposit it in the pit 37. While the wheels 18 are journaled on the spindles, the shaft is operated by a clutch device 21, operated by a shift-lever 22, the free end of which rests on a notched bar 23 and is held in position by a hand-clutch 24, the point of which enters alternately the perforations 25 and 26, the operation of which is to hold the clutch into the hub, and thereby operate the shaft or to release it from the hub and let the wheel revolve without revolving the shaft. On the other end of the shaft and just outside of the hopper is rigidly secured a gear-wheel 27, which meshes with and rotates a larger gear-wheel 28, rigidly secured on a shaft 29, journaled in bearings 30, secured on the outside walls of the hopper. This shaft is provided with stirrers 31, which thoroughly mix the fertilizer, keep it agitated, and constantly incline it downwardly to the opening 3. These stirrers are pins which pass through the shaft at right angles to each other.

Mounted on the frame is the hopper 32, the sides of which are vertical, while the end walls slope inwardly as they extend downwardly. On the inside of the hopper are boards 33, forming inclined walls the lower edges of which incline inwardly and incline the fertilizer to the opening 3. To the rear wall and on the rear face thereof is secured a pocket 34, in which is seated an oil-can 35, and to hold the same from dropping out a spring 36 is secured at its lower end to said pocket, while its upper end rests against said can. To the front part of the hopper is secured a pair of shafts at proper distance from the lower part of the wheels to keep the hopper in a vertical position. This device is also provided below the hopper 33 with a pit 37, said pit having perforated flanges 38. Said pit is secured to the device by means of bolts and nuts 39, which pass through cross-beams 40, secured between the framework and through the perforations in the flanges 38 of said pit. Said pit has cut in one side of its bottom, extending a little beyond its center, a recess 41, and said recess is so cut as to leave in each end wall thereof a dovetailed projection 42, and in this recess is fitted a movable plate 43, having its ends dovetailed to fit in the dovetails just mentioned, so that said plate can move in and out and yet be securely held in position. This plate as it moves in and out leaves a slot 44, which is regulated by a threaded bolt 45, which passes through a threaded bearing 46 and thence through a lug 47, secured to the lower face of the above-mentioned plate 43. Thus the slot 44 may be made narrow or wide to suit the flow of the commercial fertilizer. To the front beam of the frame is secured a hook 48, to which the horse may be hitched.

The arms of the wheel 20 are curved substantially in the arc of a circle and extend out and away from the shaft 16 in the direction in which the said shaft turns while in operation. The arms of said wheel 20 while over the shaft 16 pass up through the opening 3 and extend up into the hopper 32, and consequently as the said wheel 20 is rotated the ends of the said arms engage the fertilizer in the hopper, and by means of the curved shape of the said arms the said fertilizer is forced down through the space between the two horizontal plates 4 4 and deposited in the pit 37 and a tendency to force the fertilizer to one side within the hopper without dragging it through the opening 3 is avoided, which would be the case if the arms of the wheel 20 were straight and extended radially.

Having described my invention, what I claim as new, and desire to secure by Letters Patent, is—

A distributer consisting of a hopper suitably mounted, said hopper having in its bottom an opening and a means for regulating the size of said opening consisting of laterally-adjustable plates, a pit located below said hopper and surrounding the opening in the bottom of the same and having an outlet located in its lowest part and directly below the opening in the bottom of the hopper, a wheel journaled in said pit and having curved arms passing through the space between said plates and extending up into the hopper and being adapted to draw the fertilizer from the hopper into the pit and deposit it upon the outlet thereof.

In testimony whereof I affix my signature in presence of two witnesses.

RANSOM G. CARTIN.

Witnesses:
J. E. LAMBERT,
E. P. FAULCONER.